(12) United States Patent
Schmidt et al.

(10) Patent No.: US 11,795,994 B1
(45) Date of Patent: Oct. 24, 2023

(54) SOCKET ASSEMBLY WITH ANTIROTATION SPRING WASHER

(71) Applicant: Zhejiang Ruitai Suspension System Technology LTD, Fenghua (CN)

(72) Inventors: George R. Schmidt, St. Louis, MO (US); Haibin Jiang, Fenghua (CN)

(73) Assignee: ZHEJIANG RUITAI SUSPENSION SYSTEM TECHNOLOGY LTD, Ningbo (CN)

( * ) Notice: Subject to any disclaimer, the term of this patent is extended or adjusted under 35 U.S.C. 154(b) by 29 days.

(21) Appl. No.: 16/715,491

(22) Filed: Dec. 16, 2019

(51) Int. Cl.
*F16C 11/06* (2006.01)

(52) U.S. Cl.
CPC ........ *F16C 11/0652* (2013.01); *F16C 11/0647* (2013.01); *Y10T 403/32762* (2015.01); *Y10T 403/32811* (2015.01)

(58) Field of Classification Search
CPC .............. F16C 11/0638; F16C 11/0642; F16C 11/0647; F16C 11/0652; F16C 11/0661; Y10T 403/32647; Y10T 403/32655; Y10T 403/32713; Y10T 403/32762; Y10T 403/32811; F16B 39/24
USPC .................................. 411/162, 163, 164, 165
See application file for complete search history.

(56) References Cited

U.S. PATENT DOCUMENTS

| | | | | |
|---|---|---|---|---|
| 1,660,772 A * | 2/1928 | Swenson | ................ | F16B 39/24 411/165 |
| 1,821,312 A * | 9/1931 | Lillig | .................... | F16B 39/24 411/957 |
| 1,863,343 A * | 6/1932 | Kunkle et al. | ...... | F16C 11/0628 403/139 |
| 2,350,398 A | 6/1944 | Hufferd | | |
| 2,495,959 A | 1/1950 | Flumerfelt | | |
| 2,993,717 A * | 7/1961 | Gottschald | ......... | F16C 11/0623 403/133 |
| 3,072,426 A | 1/1963 | Gilbert | | |
| 3,090,642 A | 5/1963 | Gottschald et al. | | |
| 3,514,832 A * | 6/1970 | Wehner | .............. | F16C 11/0647 29/441.1 |
| 3,516,717 A * | 6/1970 | Peterson | ................. | F16C 19/52 384/517 |
| 3,667,789 A * | 6/1972 | McNeely et al. | ... | F16C 11/0619 403/128 |
| 3,902,816 A * | 9/1975 | Moore | ............... | F16C 11/0604 403/114 |
| 4,478,531 A * | 10/1984 | Levinson et al. | ........ | B62D 7/18 403/77 |
| 4,662,772 A * | 5/1987 | Schultz | ................. | B60K 20/02 403/114 |
| 5,007,746 A * | 4/1991 | Matzelle et al. | ........ | F16C 17/04 384/420 |
| 5,772,352 A | 6/1998 | Fukumoto et al. | | |
| 5,967,722 A * | 10/1999 | Fett | ........................ | F16B 39/10 411/953 |

(Continued)

FOREIGN PATENT DOCUMENTS

GB 1233906 6/1971

*Primary Examiner* — Amber R Anderson
*Assistant Examiner* — Kevin J Baynes
(74) *Attorney, Agent, or Firm* — Grace J. Fishel (57) ABSTRACT

In a socket assembly having a housing with a closed end and an open end and an axially slidable and rotatable bearing, a spring washer seated on the axially slidable and rotatable bearing with a protrusion or a recess on the external periphery for engagement with a cooperating recess or protrusion on an inner cavity of the housing to effectively stop movement of spring washer with the axially slidable and rotatable bearing during driving conditions.

6 Claims, 6 Drawing Sheets

(56) References Cited

U.S. PATENT DOCUMENTS

| | | | |
|---|---|---|---|
| 6,840,697 B1* | 1/2005 | Dorr | F16C 11/0638 403/138 |
| 7,083,356 B2 | 8/2006 | Paduano | |
| 7,753,611 B2* | 7/2010 | Ergodan et al. | B62D 7/166 403/138 |
| 8,714,862 B2* | 5/2014 | Mevorach et al. | F16C 11/0642 403/144 |
| 8,794,860 B1 | 8/2014 | McGean et al. | |
| 9,296,271 B2* | 3/2016 | Mevorach et al. | F16C 11/0647 |
| 9,845,823 B1 | 12/2017 | Yaworsky et al. | |
| 9,982,711 B1 | 5/2018 | Henriksen | |
| 10,294,983 B2 | 5/2019 | Parker et al. | |
| 10,308,089 B2* | 6/2019 | Elterman | B60G 7/001 |
| 10,371,195 B2 | 8/2019 | Parker et al. | |
| 10,527,087 B2* | 1/2020 | Sugg | F16C 11/0633 |
| 11,149,783 B2* | 10/2021 | Schmidt et al. | B60D 1/58 |
| 11,255,376 B2* | 2/2022 | Richter et al. | F16C 11/0638 |
| 11,339,824 B2* | 5/2022 | Schaumann et al. | B60G 7/005 |
| 2004/0258463 A1* | 12/2004 | Dorr | F16C 11/0638 403/137 |
| 2006/0140712 A1* | 6/2006 | Sun et al. | F16C 11/0628 403/135 |
| 2019/0309793 A1 | 10/2019 | Schmidt et al. | |

\* cited by examiner

SOCKET ASSEMBLY WITH ANTIROTATION SPRING WASHER

BACKGROUND OF THE INVENTION

Field of the Invention

The present invention relates to a ball joint socket assembly wherein a spring washer imparting a biasing force on an axially slidable bearing and a ball portion of a ball stud is stopped from rotation with movement of the ball stud.

Brief Description of the Prior Art

One of the difficulties with ball joint sockets is the need to prohibit some of the cooperating internal components from rotating against each other during steering operations. Some internal components such as the housing cavity, cover plate and a tolerance absorbing spacer as described in U.S. Application Serial No. 15/947,833 are not hardened to resist wear. As such, these components if exposed to sliding motion will wear excessively.

In the prior art, various designs have been provided to resist the relative rotation motion. For instance, the internal bearing has been split thus allowing for a slight interference to occur between the bearing OD and the housing cavity ID. The interference increases some resistance to rotation of the bearing but is only marginally successful because it is very difficult to manage all involved variables between bearing and housing cavity, particularly when the bearing is subject to warpage during the hardening process. The variables work together to create too much or too little interference. Too little interference results in not enough friction between the bearing and the sidewall to effectively resist rotation. Too much friction can result in tight and inconsistence assembly motion. In other cases, the split internal bearing can cause fracture of the bearing and premature loosening of the socket.

While not typical, the cover plate or even the housing cavity can be hardened so that relative rotational motion will not create excessive wear but adding hardening operations creates additional cost and complication. In addition, hardening is not an option with the tolerance absorbing spacer described in serial No. 15/947,833 which must be fully plastic to function and, as a result, must be soft. If the internal components contacting the tolerance compensating spacer rotate during steering actions, the spacer will wear excessively.

BRIEF SUMMARY OF THE INVENTION

In view of the above, it is an object of the present invention to provide a socket assembly wherein a spring washer is stopped from rotation against the cooperating internal components of the ball joint. It is another object to provide a socket assembly including a tolerance compensating spacer which is protected from excessive wear during driving operations by the spring washer. Other objects and features of the invention will be in part apparent and in part pointed out hereinafter.

A representative improved socket assembly in accordance with the present invention has a housing with an inner cavity which extends from a first open end to a second open end. A ball stud with a ball portion and a shank portion is at least partially disposed within the inner cavity of the housing with the shank portion extending out of the housing through the first open end. An axially slidable bearing is disposed in the inner cavity at the second open end. The slidable bearing has an outer surface engaged with the inner cavity and a bearing surface that is in surface-to-surface contact with the ball portion. There is a cover plate closing the second open end of the housing and a spring washer positioned on the slidable bearing for imparting a biasing force between the cover plate and the slidable bearing and the ball portion of the ball stud. The spring washer has at least one protrusion on an exterior periphery of the washer which is received in at least one cooperating recess in the inner cavity of the housing for use in preventing rotation of the spring washer with the axially slidable bearing. In other cases the location of the protrusions and recesses may be reversed with recess(es) being on the spring washer and the protrusion(s) on the inner cavity of the housing. For some other applications, the protusion(s) and recess(es) on the inner cavity may be formed as axial ridges and channels, respectively.

While the spring washer may be oriented with a convex side facing the axially slidable bearing, concave positioning of the spring washer on the axially slidable bearing applies a greater resisting moment to the twisting moment generated by the ball portion of the ball stud during steering actions into the bearing, thus effectively holding the axially slidable bearing from rotating with the ball portion of the ball stud and therefore may be preferred in some cases.

Another important aspect of the invention arises when the cooperating internal components of the ball joint include a tolerance absorbing spacer such as described in U.S. Application Serial No. 15/947,833. In that case, stopping rotation of the spring washer is desirable as the tolerance absorbing spacer is relatively soft and prone to premature wear.

In some implementations, the ball stud exits the socket through the second open end with first end being permanently closed In this case, a closure ring replaces the cover plate but the spring washer operates in the same manner as in the other embodiments.

It will be apparent to those skilled in the art that the above description of the various socket assemblies forming a part of the present invention is at a high level and that other important elements such as provisions for lubricants and so forth are omitted for clarity.

BRIEF DESCRIPTION OF THE SEVERAL VIEWS OF THE DRAWINGS

In the accompanying drawings, in which several of various possible embodiments of the invention are illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
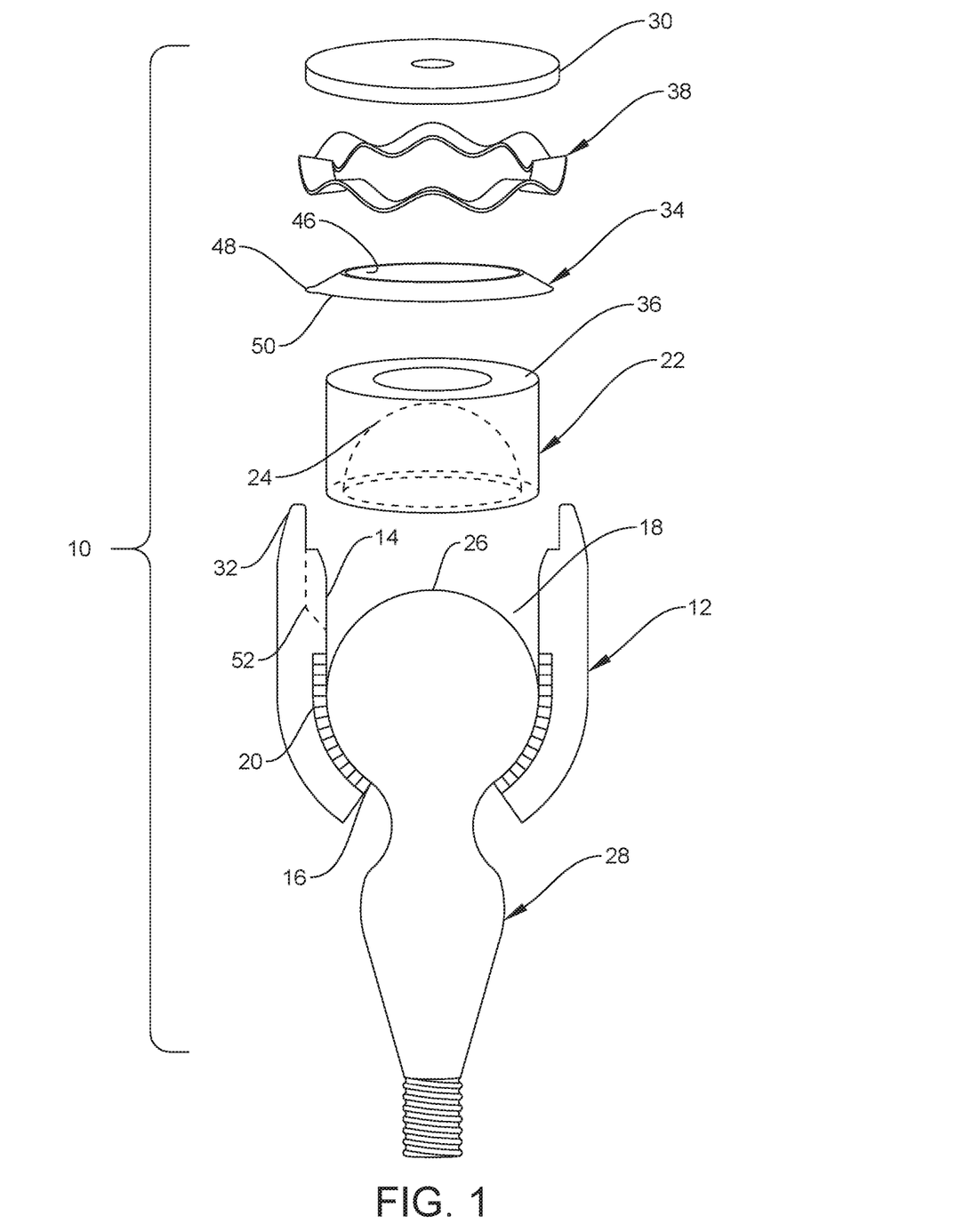
FIG. 1 is a blown apart schematic view of an improved assembly in accordance with the present invention.

Referring to the drawings more particularly by reference character, a first exemplary embodiment of an improved socket assembly 10 (specifically a ball joint assembly) is shown in FIG. 1. It will be appreciated that socket assembly 10 may find uses in tie rod ends, ball joints or in a wide range of other automotive and non-automotive applications.

With continuing reference to FIG. 1 socket assembly 10 includes a housing 12 with an inner cavity 14 that extends from a first open end 16 to a second open end 18. First open end 16 of housing 12 presents a lower wall with inner surface which provides fixed bearing surface 20. Fixed bearing surface 20 is semi-spherically curved radially inwardly and faces axially towards second open end 18 and may be integrally formed with housing 12 or may be a second bearing part installed in housing 12 through second open end 18.

An axially slidable bearing 22 is installed in second open end 18 and is movable in a longitudinal direction towards fixed hardened bearing surface 20 in first open end 16. Axially slidable bearing 22 has a bearing surface 24 that has a similar curvature to a ball portion 26 of a ball stud 28 and contacts an opposite hemisphere of the ball portion 26 with respect to fixed hardened bearing surface 20 illustrated as a hardened portion of inner cavity 14. Ball portion 26 of ball stud 28 is also surface hardened and supported between fixed bearing surface 20 (or fixed bearing) and bearing surface 24 of axially slidable bearing 22 to allow ball portion 26 to rotate and articulate relative to fixed bearing surface 24 and housing 12.

Figure 3:
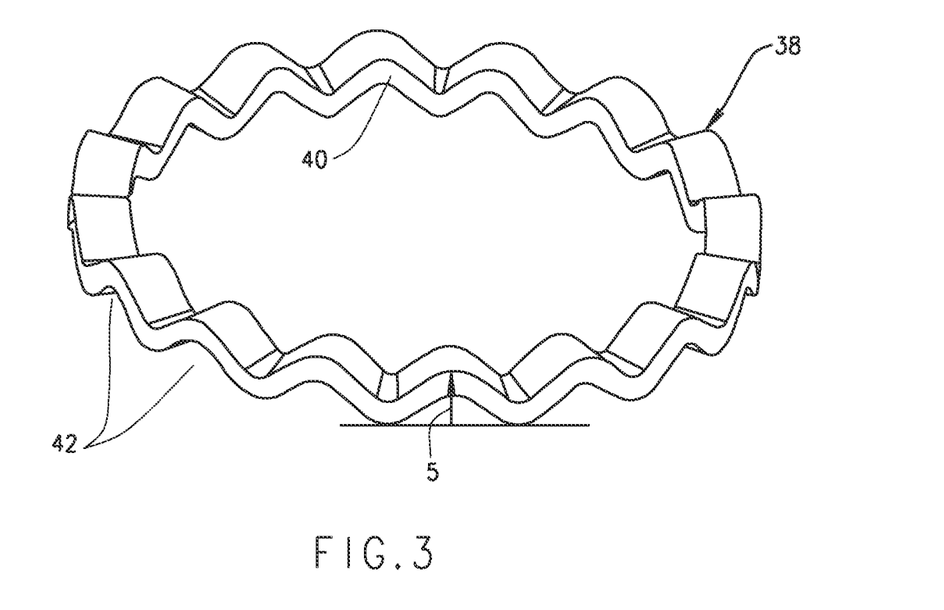
FIG. 3 is a perspective view of a tolerance absorbing spacer in accordance with serial No. 15/947,833.

Second open end 18 is closed with a cover plate 30 which is secured in housing 12 with a crimped, spun-over, or welded portion 32 of second open end 18 after socket assembly 10 has been assembled. A spring washer 34 (also called a Belleville spring) is provided between cover plate 30 and a top surface 36 of axially slidable bearing 22 so as to urge axially slidable bearing 22 towards fixed bearing surface 20 and against ball portion 26 of ball stud 28. A tolerance absorbing spacer 38 may be inserted between spring washer 34 and cover plate 30 as shown in FIG. 1, tolerance absorbing spacer 38 is described in U.S. Pat. Application Serial No. 15/947,833 (U.S. Pat. No. 11,149,783) which is incorporated by reference herein in its entirety. In brief, tolerance absorbing spacer 38 is formed as a flat annulus 40 with a plurality of wave forms 42 in the axial direction and extending around the annulus (FIG. 3). As a result, there is slight greater spacing of the waves at the outside diameter relative to the spacing of the waves at the inside diameter with constant amplitude 5. During assembly of socket assembly 10, tolerance absorbing spacer 38 is plastically deformed by a force applied substantially in the axial direction leaving a controlled and desirable clearance space 44 (FIG. 8) in the assembly within which spring washer 34 operates. Because tolerance absorbing spacer 38 is deformable it is formed of a softer material than spring washer 34. It is therefore desirable to stop rotation of spring washer 34 with ball portion 26 of ball stud 28 and thus prevent rotation sliding motion of spring washer 34 against tolerance absorbing spacer 38 during steering actions of the vehicle.

Figure 2:
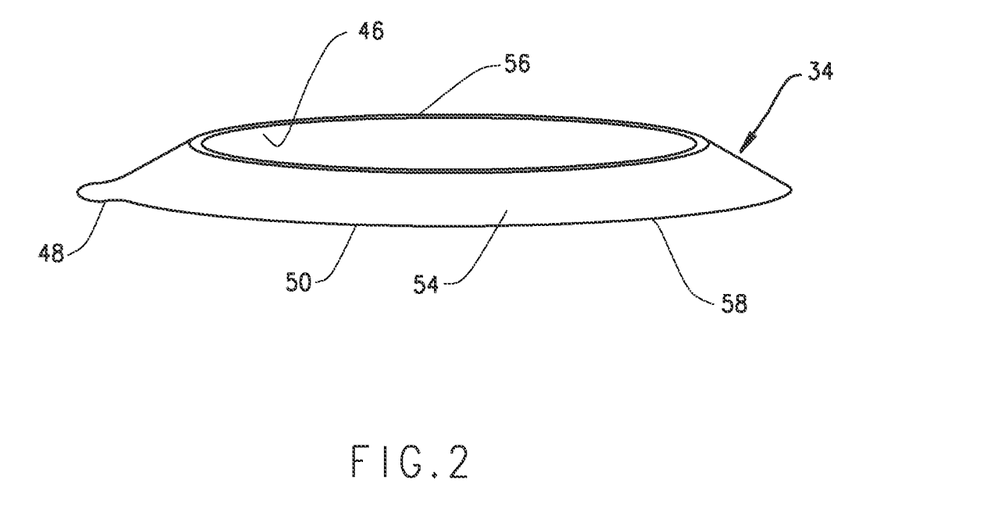
FIG. 2 is a perspective view of a spring washer having a protrusion for engagement with a recess formed as an axially aligned channel in an inner cavity of a socket housing.

As shown in FIG. 1, in one embodiment of socket assembly 10, spring washer 34 is positioned on top surface 36 of axially slidable bearing 22 with a concave side 46 down. Spring washer 34 has a protrusion 48 on a periphery 50 as shown in FIGS. 1 and 2 which is received in a cooperating recess 52 in inner cavity 14 of housing 12 according to FIG. 1. Rotating movement of spring washer 34 is thus stopped as ball portion 26 rotates in axially slidable bearing 22. It will be appreciated that one or more protrusions 48 may be provided on periphery 50 and one or more recesses 52 may be provided as channels axially aligned with inner cavity 14 of housing 12. It will also be appreciated that the elements may be reversed wherein one or more cooperating recesses 52 are formed in periphery 50 of spring washer 34 for receipt in one or more protrusions 48 formed as axially aligned ridges on inner cavity 14 of housing 12 and that protrusions 48 may be rectangular, semicircular, triangular or the like in cross-section for engagement of with recesses 52 of cooperating shape.

Figure 4:
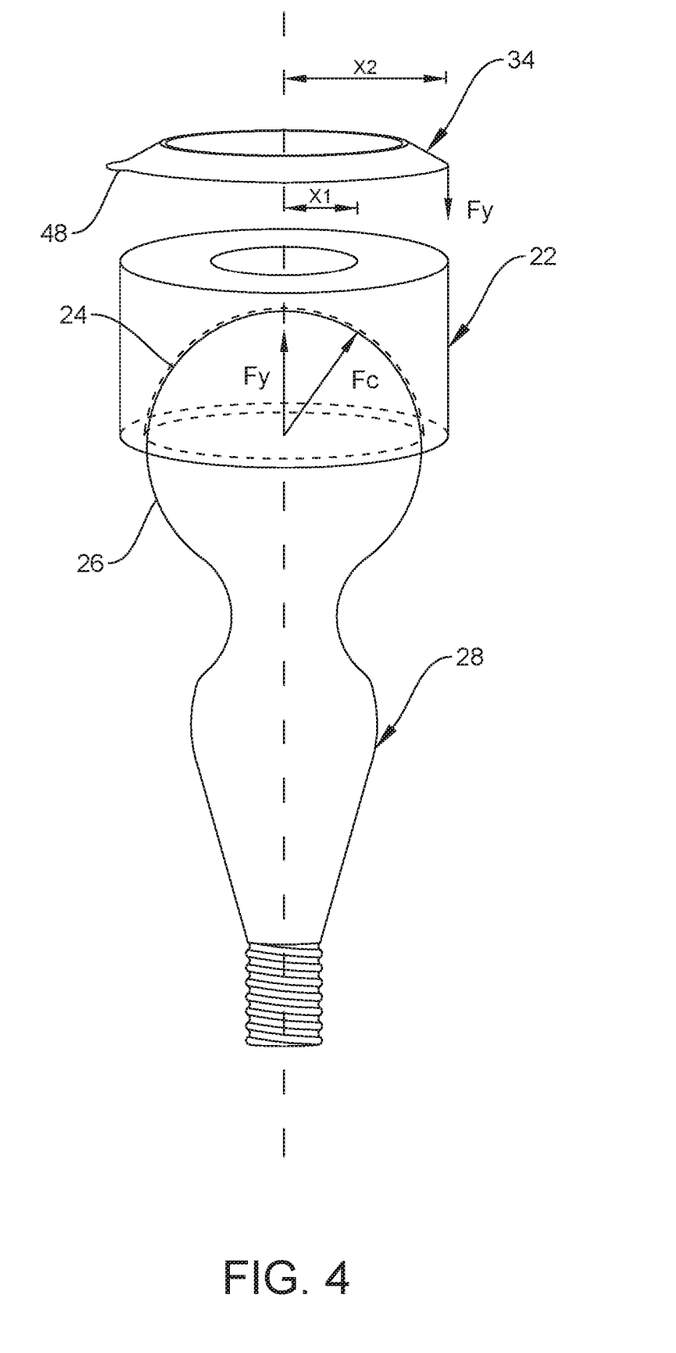
FIG. 4 is a schematic view showing force vectors on an axially slidable bearing applied by a spring washer and resisted by a ball portion of a ball stud with a protrusion on its exterior periphery.

Turning to FIG. 4, protrusion 48 on spring washer 34 received in recess 52 also tends to stop rotation of axially slidable bearing 22 with hardened ball portion 26 of ball stud 28 during vehicle steering operations. This rotation is undesirable, as it will cause excessive wear between the hardened axially slidable bearing 22 and (typically) soft inner cavity 14 of housing 12. The twisting moment between ball portion 26 and bearing surface 24 may be represented by the product of contact force (Fc ball, multiplied by coefficient of friction, then multiplied by distance X1). This twisting moment is resisted by a resisting moment composed of the product of (Fy, multiplied by the same coefficient of friction, then multiplied by distance X2). Although Fy is slightly less than Fc, X2 is significantly greater than X1 and therefore the product of the resisting moment is greater than the twisting moment. Axially slidable bearing 22 may therefore be effectively held without rotation by locking spring washer 34.

Figure 5:
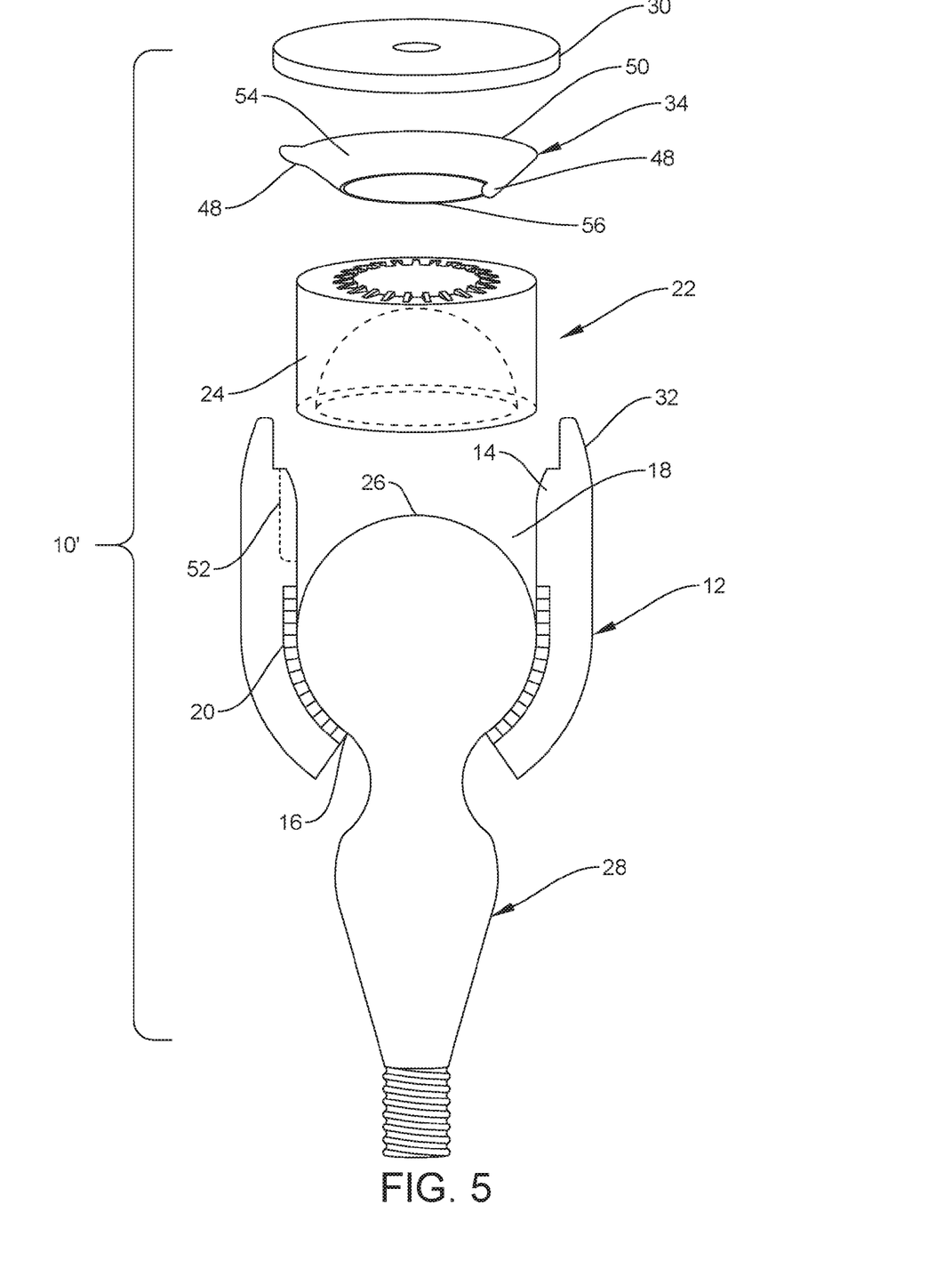
FIG. 5 is a blown apart schematic view of a second improved socket assembly incorporating a spring washer with its convex side facing the axially slidable bearing and with a protrusion on its exterior periphery for engagement with one or more cooperating recesss in the inner cavity of the housing (not shown) and with a protrusion on its interior periphery for engagement with one of a plurality of recesses formed between cooperating teeth on the axially slidable bearing. Recesses in this figure are formed below the plane of the top surface of the axially slidable bearing.
Figure 6:
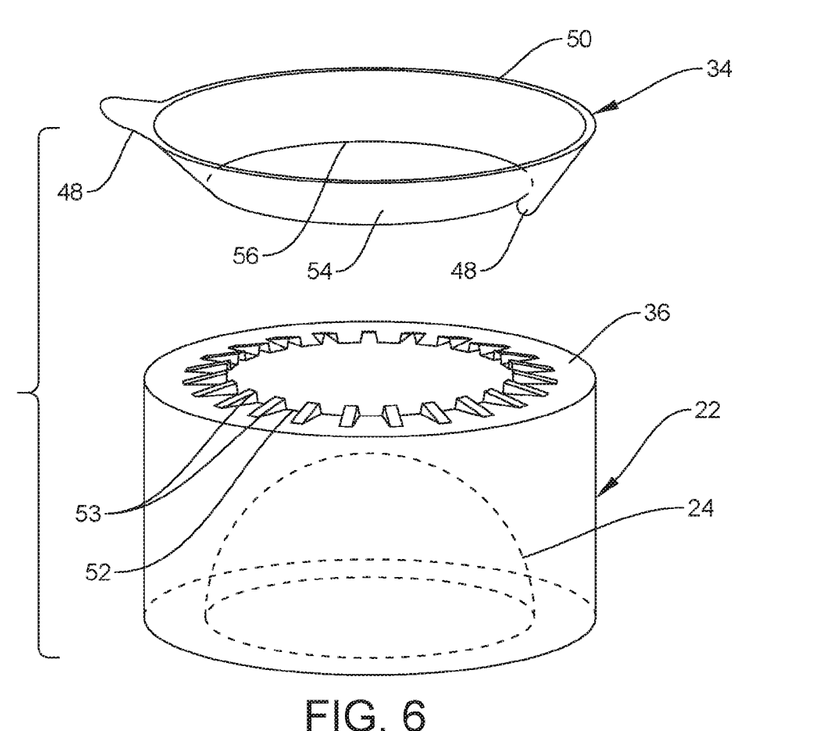
FIG. 6 is a blown apart view of a spring washer with its convex side facing the axially slidable bearing and with a protrusion on its exterior periphery for engagement with one or more cooperating recesses in the inner cavity of the housing (not shown) and with a protrusion on its interior periphery for engagement with a plurality of cooperating recesses in the plane of the top surface of the axially slidable bearing formed between raised teeth on the axially slidable bearing.
Figure 7:
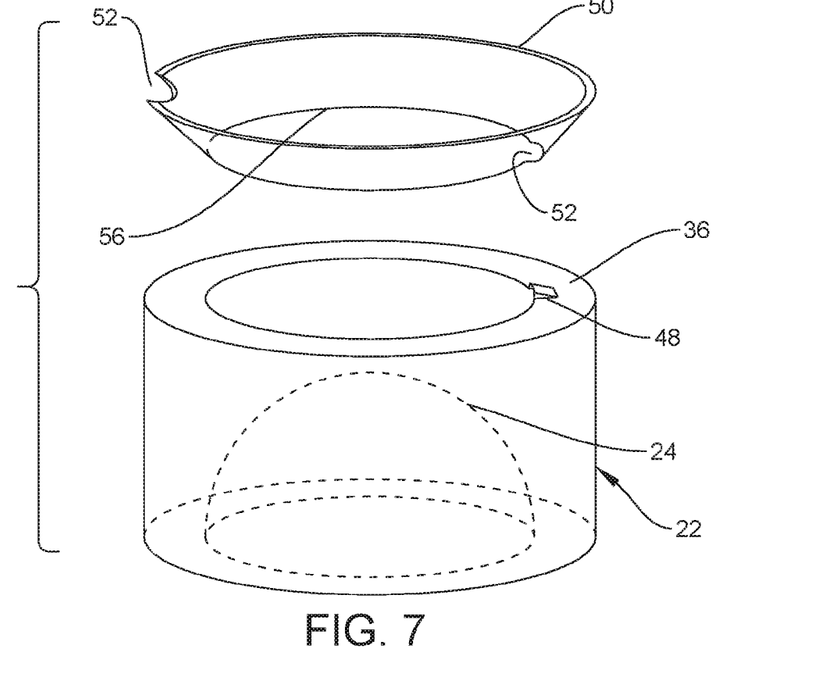
FIG. 7 is a blown apart view of a spring washer with one or more recesses formed in its exterior periphery and one or more recesses formed in its interior periphery for engagement with a like number of protrusions on the inner cavity of the housing and the axially slidable bearing, respectively; and, FIG. 8 is a sectional view of a socket assembly with a second open end and a closed first end a tolerance absorbing spacer and slidable bearing including spaces between a toothed inner ring to engage an interior protrusion on spring washer.

In another embodiment of socket assembly 10' as shown in FIGS. 5-7, spring washer 34 is positioned with a convex side 54 of spring washer 34 positioned on top surface 36 of axially slidable bearing 22. Spring washer 34 is a conical frustrum with an exterior periphery 50 and an interior periphery 56. As before, exterior periphery 50 of spring washer 34 may include a protrusion 48 (FIGS. 5-6) or recess 52 (FIG. 7) for engaging inner cavity 14 of housing 12 and stopping rotation of spring washer against tolerance absorbing spacer 38 when present, or against cover plate 30. Interior periphery 56 of spring washer 34 may be provided with a one or more recesses 52 (FIG. 7) for engagement with one or more protrusions 48 provided on inner top edge of axially slidable bearing 22 (FIG. 7). As shown in FIG. 6, the elements may be reversed with one or more protrusions 48 in interior periphery 56 of spring washer 34 for engagement with one or more recesses 52 in, or between raised teeth 53 on top inner surface of axially slidable bearing 22.

Figure 8:
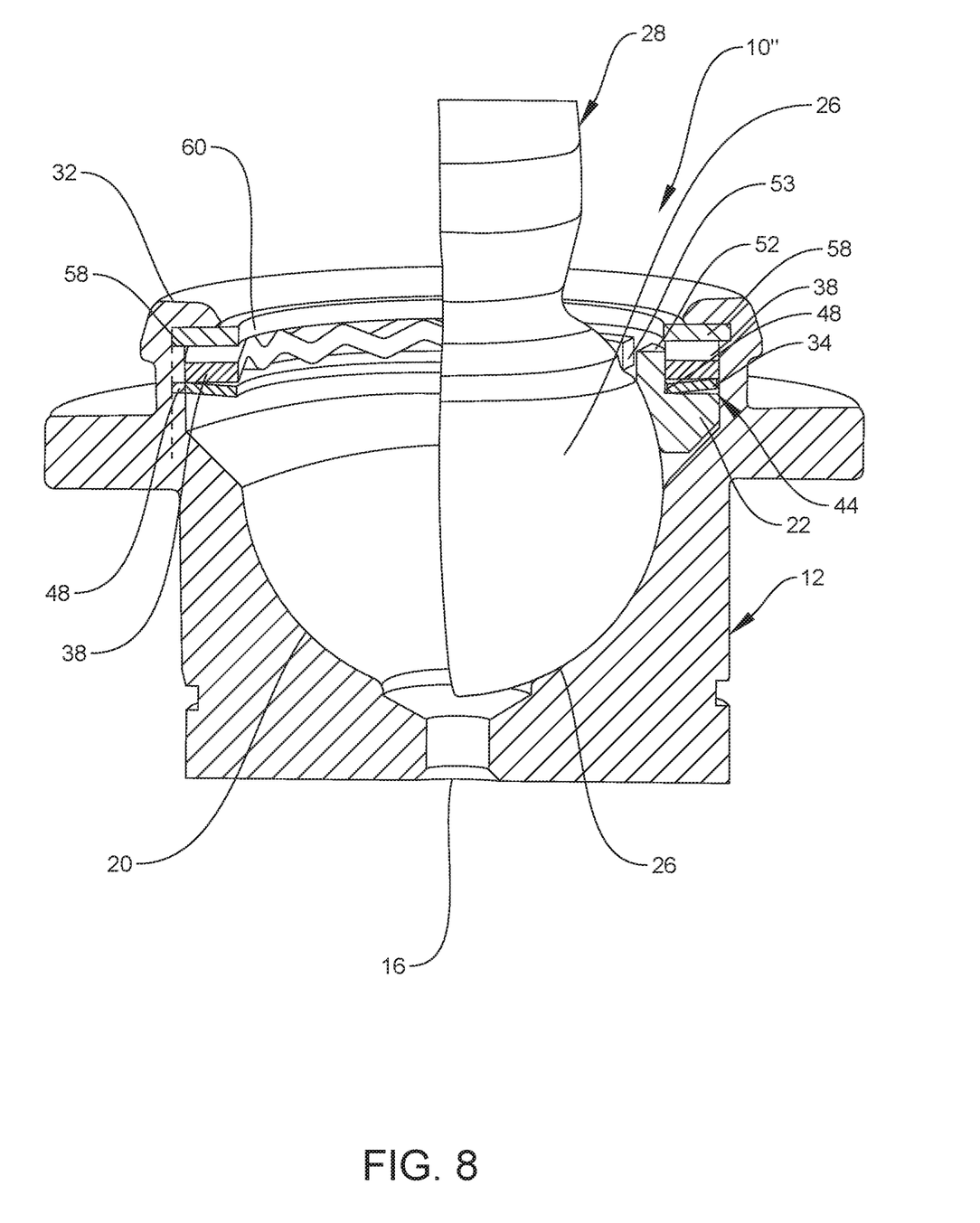

FIG. 8 shows a still further alternate socket assembly 10" wherein first end 16 of housing 12 is closed and second open end 18 allows ball stud 28 to exit the housing and attach to a cooperating chassis part by various means. A closure ring 58 is provided at second end 18 with an aperture 60 for ball stud 28 in place of cover plate 30. This style of joint carries the weight of the vehicle by pushing the stud into the socket. As with the socket assemblies 10 and 10' discussed earlier, spring washer 34 and tolerance absorbing spacer 38, when present, operate in the same manner as the embodiments previously described. Spring washer 34 operates in controlled clearance space 44 left by tolerance absorbing spacer 38 and during assembly is positioned on axially slidable bearing 22 and imparts a biasing force between closure ring 58 and slidable bearing 22 and ball portion 26 of ball stud 28.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A socket assembly comprising:
   a housing having an inner cavity which extends from a first open end to a second open end;
   a ball stud at least partially disposed within said inner cavity of said housing and including a shank portion and a ball portion, said shank portion extending out of said housing through said first open end;
   an axially slidable and rotatable bearing disposed in said inner cavity of said housing at the second open end, said slidable and rotatable bearing being semi-spherically curved radially inwardly and facing towards said first open end and having an outer surface engaged with the inner cavity of the housing, said slidable and rotatable bearing having a bearing surface that is in surface-to-surface contact with said ball portion;
   a cover plate closing said second open end of said housing;
   a tolerance absorbing spacer formed as an annulus with a substantially consistent thickness and with a plurality of substantially regularly shaped wave forms in an axial direction and extending circumferentially around the annulus, said wave forms having a constant amplitude from an outside diameter to an inside diameter of the annulus, said tolerance spacer plastically deformed by a force applied substantially in the axial direction leaving a controlled clearance space in the assembly; and,
   a spring washer positioned on the slidable and rotatable bearing below the tolerance absorbing spacer in the controlled clearance space for imparting a biasing force between the cover plate and the slidable and rotatable bearing to the ball portion of the ball stud, said spring washer having a periphery with at least one protrusion which is received in at least one cooperating axially aligned recess in the inner cavity of the housing or having a periphery with at least one recess which receives at least one cooperating protrusion on the inner cavity of the housing, said at least one protrusion or at least one recess in the spring washer preventing rotation of the spring washer with the axially slidable and rotatable bearing and rotation of the spring washer against the tolerance absorbing spacer.

2. The socket assembly of claim 1 wherein a concave side of the spring washer is positioned on the axially slidable and rotatable bearing.

3. The socket assembly of claim 1 wherein a convex side of the spring washer is positioned on the axially slidable and rotatable bearing.

4. A socket assembly comprising:
   a housing having an inner cavity which extends from at least one open end;
   a ball stud at least partially disposed within said inner cavity of said housing and including a shank portion and a ball portion, said shank portion extending out of said housing through said open end;
   an axially slidable and rotatable bearing disposed in said inner cavity of said housing at the at least one open end, said slidable and rotatable bearing having an outer surface engaged with the inner cavity of the housing, said axially slidable and rotatable bearing having a bearing surface that is in surface-to-surface contact with said ball portion and having a cylindrial portion in contact with the inner cavitiy of said housing;
   a closure ring at said at least one open end of said housing allowing said ball stud to protrude through an aperture of said closure ring;
   a spring washer positioned on the slidable and rotatable bearing for imparting a biasing force between the closure ring and the slidable and rotatable bearing and the ball portion of the ball stud, said spring washer having an exterior periphery with at least one protrusion which is received in at least one cooperating axially aligned recess in the inner cavity of the housing or having an exterior periphery with at least one recess which receives at least one cooperating protrusion on the inner cavity of the housing, said at least one protrusion or at least one recess in the spring washer preventing rotation of the spring washer with the axially slidable and rotatable bearing and rotation of the spring washer against the closure ring; and,
   a tolerance absorbing spacer formed as an annulus with a substantially consistent thickness and with a plurality of wave forms in an axial direction and extending circumferentially around the annulus, said wave forms having a constant amplitude from an outside diameter to an inside diameter of the annulus, said tolerance spacer plastically deformed by a force applied substantially in the axial direction leaving a controlled clearance space in the assembly, said spring washer contacting the slidable and rotatable bearing and positioned below the tolerance absorbing spacer in the controlled clearance space.

5. The socket assembly of claim 4 wherein a concave side of the spring washer is positioned on the axially slidable and rotatable bearing.

6. The socket assembly of claim 4 wherein a convex side of the spring washer is positioned on the axially slidable and rotatable bearing.

* * * * *